United States Patent
Miyata (10) Patent No.: US 8,199,959 B2
(45) Date of Patent: Jun. 12, 2012

(54) CARD-TYPE DEVICE AND METHOD FOR MANUFACTURING SAME

(75) Inventor: Kazuhiko Miyata, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 1367 days.

(21) Appl. No.: 11/813,447

(22) PCT Filed: Mar. 31, 2006

(86) PCT No.: PCT/JP2006/306814
§ 371 (c)(1),
(2), (4) Date: Jul. 6, 2007

(87) PCT Pub. No.: WO2006/114985
PCT Pub. Date: Nov. 2, 2006

(65) Prior Publication Data
US 2009/0290746 A1   Nov. 26, 2009

(30) Foreign Application Priority Data
Apr. 22, 2005   (JP) ................... 2005-125746

(51) Int. Cl.
*H04R 1/02* (2006.01)
(52) U.S. Cl. ................................. 381/388; 381/190
(58) Field of Classification Search ............... 381/182, 381/190, 191, 306, 333, 353, 388, 431
See application file for complete search history.

(56) References Cited

U.S. PATENT DOCUMENTS

| | | | |
|---|---|---|---|
| 6,278,790 B1 | 8/2001 | Davis et al. | |
| 6,342,831 B1 | 1/2002 | Azima | |
| 6,345,897 B1 | 2/2002 | Furuhata | |
| 6,427,016 B1 | 7/2002 | Azima et al. | |
| 6,427,017 B1 | 7/2002 | Toki | |
| 7,174,025 B2 | 2/2007 | Azima et al. | |
| 7,336,795 B2 * | 2/2008 | Miyata et al. | 381/152 |
| 7,876,916 B2 * | 1/2011 | Miyata et al. | 381/152 |
| 2001/0026625 A1 | 10/2001 | Azima et al. | |
| 2002/0154274 A1 | 10/2002 | Furuhata | |
| 2004/0165125 A1 | 8/2004 | Saida et al. | |
| 2005/0002537 A1 | 1/2005 | Azima et al. | |
| 2005/0105747 A1 | 5/2005 | Miyata et al. | |

FOREIGN PATENT DOCUMENTS

| | | |
|---|---|---|
| GB | 2 332 953 A | 7/1999 |
| JP | 02-228199 A | 9/1990 |
| JP | 10-210586 A | 8/1998 |
| JP | 11-002812 A | 1/1999 |
| JP | 11-194350 A | 7/1999 |
| JP | 2001-133761 A | 5/2001 |
| JP | 2002-533957 A | 10/2002 |
| JP | 2003-522426 A | 7/2003 |
| WO | 98/28942 A | 7/1998 |

OTHER PUBLICATIONS

Official Communication for PCT Application No. PCT/JP2006/306814; mailed on May 16, 2006.

* cited by examiner

*Primary Examiner* — Roy Potter
(74) *Attorney, Agent, or Firm* — Keating & Bennett, LLP (57) ABSTRACT

In a display panel (1) performing sound generation/sound pickup through vibration, total thickness of a pair of transparent substrates (104, 105) constituting its base is set suitably for a predetermined sound quality required as an acoustic device. Consequently, a card-type device for generating sound and/or picking up sound by vibrating the display panel itself and ensuring a desired sound quality without sacrificing the setup as a display is realized.

4 Claims, 7 Drawing Sheets

CARD-TYPE DEVICE AND METHOD FOR MANUFACTURING SAME

BACKGROUND OF THE INVENTION

1. Field of the Invention

The present invention relates to a card-like device including a portable card-like substrate and having display and audio functions, and a manufacturing method of same.

2. Description of the Related Art

In recent years, there has been commercialization of portable devices equipped with the function of displaying images captured from external devices. Such portable devices must also satisfy the demand for audio capability in addition to displaying images. The acoustic device installed in the portable device for this purpose is required not to spoil the portability of the portable device.

For example, Patent Publications 1, 2, and 3 disclose a structure in which a transparent panel member disposed in front of a display panel is caused to vibrate and resonate and using this effect to output sound. Patent Publication 3 discloses an acoustic device that takes advantage of resonance of the panel member. Specifically, the acoustic device disclosed in this publication relies on the action of bending wave of the panel member, and in this device, the resonance mode of the bending wave action and the distribution of acoustically important, related surface vibration of the panel member are adjusted to suit predetermined, or at least acceptable, acoustic device characteristics.

Applicant of the present invention has developed a technique for generating or picking up sound by causing the display panel to vibrate itself, and, in Patent Publication 4, discloses a card-type device including a portable card-like substrate of a structure integrating the display and audio functions and/or driving circuits therefor.

[Patent Publication 1]
Japanese Laid-Open Patent Publication No: 2000-152385 (published on May 30, 2000)
[Patent Publication 2]
National Publication of Translated Version, Tokuhyo Publication No. 2002-533957 (published on Oct. 8, 2002)
[Patent Publication 3]
National Publication of Translated Version, Tokuhyo Publication No. 2003-522426 (published on Jul. 22, 2003)
[Patent Publication 4]
Japanese Laid-Open Patent Publication No: 2003-244784 (published on Aug. 29, 2003)
[Patent Publication 5]
Japanese Laid-Open Patent Publication No: 2004-280071 (published on Oct. 7, 2004)
[Patent Publication 6]
Japanese Laid-Open Patent Publication No: 2812/1999 (published on Jan. 6, 1999)
[Patent Publication 7]
Japanese Laid-Open Patent Publication No: 194350/1999 (published on Jul. 21, 1999)
[Patent Publication 8]
Japanese Laid-Open Patent Publication No: 133761/2001 (published on May 18, 2001)

SUMMARY OF THE INVENTION

A drawback of the foregoing structures is that they cannot realize a card-type device with a desired sound quality.

Specifically, in the structures disclosed in Patent Publications 1 to 3, the transparent panel member provided as an acoustic device in front of the display panel inevitably adds to the thickness of the device, making it difficult to realize a card-type device.

In the structure proposed by the applicant of the present invention as disclosed in Patent Publication 4, the display panel is used as an acoustic device by causing it to vibrate itself. In this way, the thickness of the device is not increased and a card-type device is realized. However, Patent Publication 4 does not describe anything about sound quality in the audio function that is realized by vibrating the display panel itself.

Patent Publication 3 discloses an acoustic device that takes advantage of resonance of the panel member and in which the resonance mode of the bending wave action and the distribution of acoustically important related surface vibration on the panel member are adjusted to suit predetermined, or at least acceptable, acoustic device characteristics. However, the acoustic device disclosed in this publication does not cause the display panel to vibrate itself. Thus, this technique cannot be used directly because it completely lacks design considerations for satisfying display requirements. If applied regardless of the design requirements for display, the produced sound quality may be far from the intended quality, or intended display characteristics may be adversely affected and deteriorate.

The present invention was made in view of the foregoing problems, and an object of the present invention is to provide a card-type device that generates and/or picks up sound by causing the display panel to vibrate itself, in which a desired sound quality can be obtained while retaining display quality. The invention also provides a manufacturing method of same.

In order to achieve the foregoing object, the present invention provides a card-type device for generating and/or picking up sound by causing a display panel to vibrate itself, wherein a thickness of a base of the display panel is set to suit a predetermined sound quality.

In order to achieve the foregoing object, the present invention provides a card-type device for generating and/or picking up sound by causing a display panel to vibrate itself, wherein a size of a non-display periphery region of a base of the display panel is set to suit a predetermined sound quality.

In order to achieve the foregoing object, the present invention provides a card-type device for generating and/or picking up sound by causing a display panel to vibrate itself, wherein a sheet-like member is laminated on a base of the display panel so as to suit a predetermined sound quality.

In order to achieve the foregoing object, the present invention provides a card-type device for generating and/or picking up sound by causing a display panel to vibrate itself, wherein a weight is affixed to a non-display region of a base of the display panel so as to suit a predetermined sound quality.

In order to achieve the foregoing object, the present invention provides a card-type device for generating and/or picking up sound by causing a display panel to vibrate itself, wherein a base of the display panel is made of a polarized transparent member, and wherein a thickness and/or density of the transparent member is set to have piezoelectric characteristics for obtaining a predetermined sound quality.

In order to achieve the foregoing object, the present invention provides a card-type device for generating and/or picking up sound by causing a display panel to vibrate itself, wherein a base of the display panel is made of a material suited for a predetermined sound quality.

In this case, the material suited for a predetermined sound quality may be, for example, a composite material with two or more kinds of components.

When using a composite material, it is preferable that the components of the composite material have different mass densities. It is also preferable that at least one of the components of the composite material be a fibrous material. Further, when using a fibrous material, it is preferable that the fibrous material be a bundle of fibers. It is also preferable that the fibrous material or the bundle of fibers be a woven cloth.

In order to achieve the foregoing object, the present invention provides a manufacturing method of a card-type device for generating and/or picking up sound by causing a display panel to vibrate itself, the method including the step of setting a thickness of a base of the display panel to suit a target sound quality.

In order to achieve the foregoing object, the present invention provides a manufacturing method of a card-type device for generating and/or picking up sound by causing a display panel to vibrate itself, the method including the step of selecting a material of a base of the display panel to suit a target sound quality.

In order to achieve the foregoing object, the present invention provides a manufacturing method of a card-type device for generating and/or picking up sound by causing a display panel to vibrate itself, the method including the step of adjusting a size of a non-display periphery region of a base of the display panel to suit a target sound quality.

In order to achieve the foregoing object, the present invention provides a manufacturing method of a card-type device for generating and/or picking up sound by causing a display panel to vibrate itself, the method including the step of laminating a sheet-like member on a base of the display panel to suit a target sound quality.

In order to achieve the foregoing object, the present invention provides a manufacturing method of a card-type device for generating and/or picking up sound by causing a display panel to vibrate itself, the method including the step of providing a weight on a non-display region of a base of the display panel to suit a target sound quality.

In order to achieve the foregoing object, the present invention provides a manufacturing method of a card-type device for generating and/or picking up sound by causing a display panel to vibrate itself, the method including the step of setting a thickness and/or density of a polarized transparent material of a base of the display panel, so as to have piezoelectric characteristics for obtaining a target sound quality.

According to the foregoing structures and manufacturing methods, the vibration characteristics of the base of the display panel can be optimized for required acoustic characteristics of the card-type device, taking into account, and without adversely affecting, display characteristics. In this way, a desired sound quality can be realized in the card-type device that generates and/or picks up sound by causing the display panel to vibrate itself.

Additional objects, features, and strengths of the present invention will be made clear by the description below. Further, the advantages of the present invention will be evident from the following explanation in reference to the drawings.

BRIEF DESCRIPTION OF DRAWINGS

FIG. 20(*a*) is a cross sectional view showing an example of adjusting a base thickness to increase the number of resonant points of a base of a liquid crystal display panel in a predetermined target frequency range.

FIG. 20(*b*) is a cross sectional view showing an example of adjusting a base thickness to increase the number of resonant points of a base of a liquid crystal display panel in a predetermined target frequency range.

DETAILED DESCRIPTION OF PREFERRED EMBODIMENTS

Figure 1:
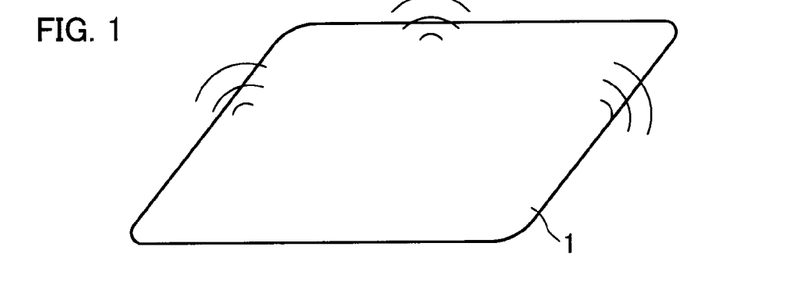
FIG. 1 is a diagram schematizing a card-type device including a display panel according to an embodiment of the present invention.
Figure 22:
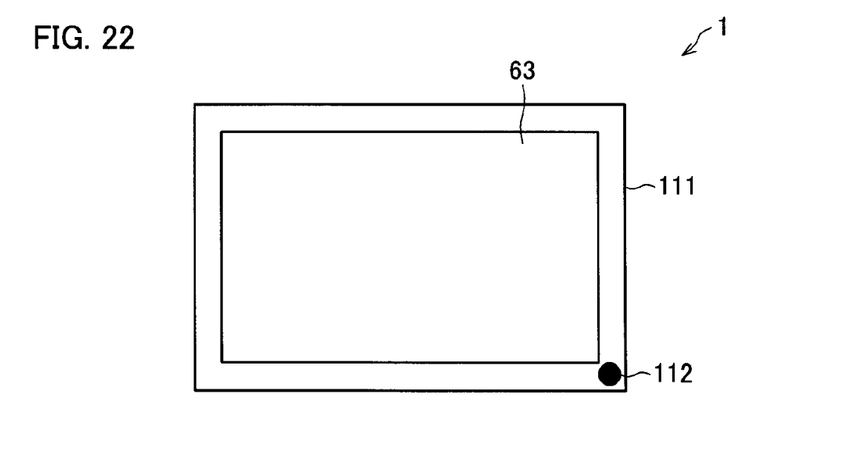
FIG. 22 is a cross sectional view showing an example of providing a weight on a frame portion of a base to increase the number of resonant points of a base of a liquid crystal display panel in a predetermined target frequency range.

The following will describe one embodiment of the present invention with reference to FIG. 1 and FIG. 22.

FIG. 1 is a schematic view of a card-type device of the present embodiment. As shown in FIG. 1, the card-type device includes a highly portable card-like display panel 1 of substantially the same size as ordinary credit cards or business cards. The display panel 1 vibrates itself to realize speaker (sound generation) and microphone (sound pickup) functions, in addition to display function.

Figure 2:
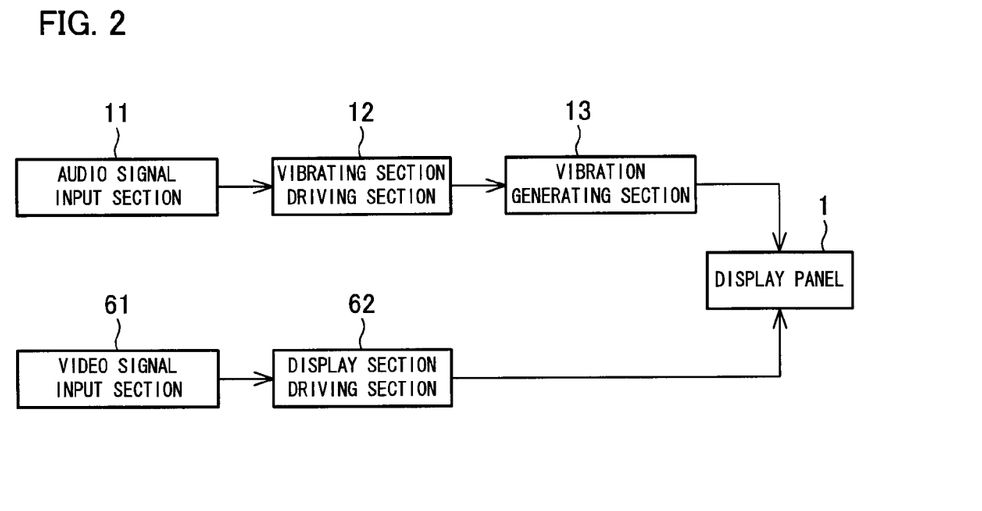
FIG. 2 is a block diagram of the card-type device.

FIG. 2 is a block diagram showing such a card-type device having a speaker function in addition to the display function. A video signal input section 61 receives video signals from various external devices. A display section driving section 62 drives the card-like display panel 1 based on the video signals supplied to the video signal input section 61. This enables the display panel 1 to reproduce images captured by the external devices.

An audio signal input section 11 receives audio signals from various external devices. A vibrating section driving section 12 drives a vibration generating section 13 based on the audio signals supplied to the audio signal input section 11. The vibration generating section 13, provided for the display panel 1, causes the display panel 1 to vibrate according to the electrical signal induced by the vibrating section driving section 12. In this manner, as schematized in FIG. 1, the card-like display panel 1 itself constitutes the vibrating section and vibrates to generate sound.

As the vibration generating section 13, a piezoelectric element may be used that is structured from a thin plate of quartz, crystal of Rochelle salt, or ceramic. The vibrating section driving section 12 is not necessarily required if the output signal of the audio signal input section 11 has a sufficient output level for driving the vibration generating section 13 and if the output signal of the audio signal input section 11 itself is an audio signal.

Further, as will be described later, the display panel 1 itself can serve as the vibrating generating section 13 when a polarized material having piezoelectric effect or the like is used as transparent substrates that constitute a base of the display panel 1. In this case, the display panel 1 may be caused to vibrate by supplying the output signal of the audio signal input section 11 to the display section 1 either directly or via the vibrating section driving section 12.

Figure 3:
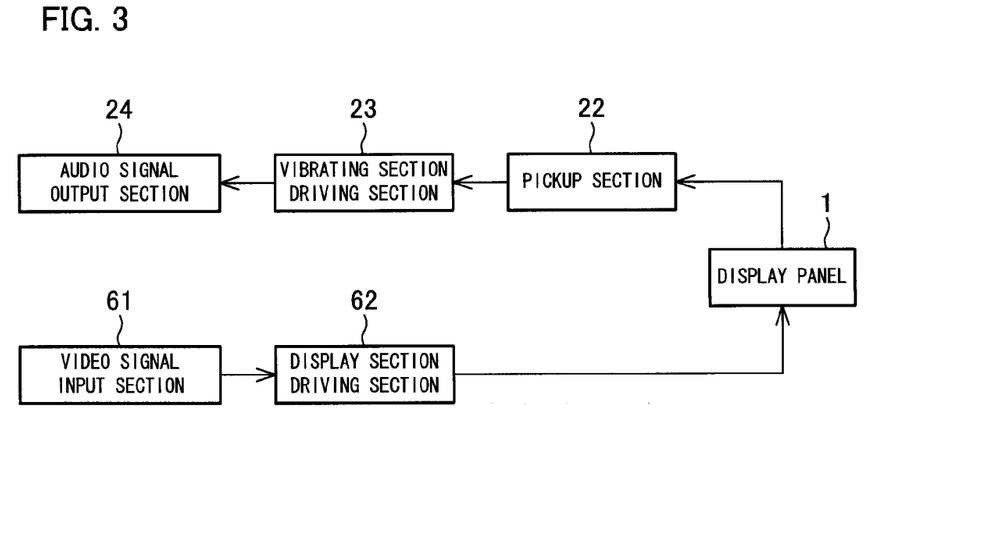
FIG. 3 is a block diagram showing another structure of the card-type device.

FIG. 3 is a block diagram illustrating a card-type device having a microphone function in addition to the display function. The structures of the components for displaying images in the display panel 1 are the same as those described with reference to FIG. 2, and no further description is made therefor.

The card-like display panel 1 is also provided with a pickup section 22. When the display panel 1 vibrates in response to external sound, the pickup section 22 converts the vibration of the display panel 1 into electrical signals. A vibrating section driving section 23 amplifies the electrical signals produced in the pickup section 22. By an audio signal output section 24, the electrical signals amplified in the vibrating section driving section 23 are outputted to various external devices. In this manner, as schematized in FIG. 1, the card-like display panel 1 itself constitutes the vibrating section and vibrates to pickup sound.

As the pickup section 22, a piezoelectric element may be used that is structured from a thin plate of quartz, crystal of Rochelle salt, or ceramic. The vibrating section driving section 23 is not necessarily required if the output signal of the pickup section 22 has a sufficient output level as an electrical signal.

Further, as in the foregoing, the display panel 1 itself can serve as the pickup section 22 when a polarized material having piezoelectric effect or the like is used as transparent substrates that constitute a base of the display panel 1. In this case, the display panel 1 may be adapted so that the electrical signals generated by undergoing vibration are outputted to the audio signal output section 24 either directly or via the vibrating section driving section 23.

Figure 4:
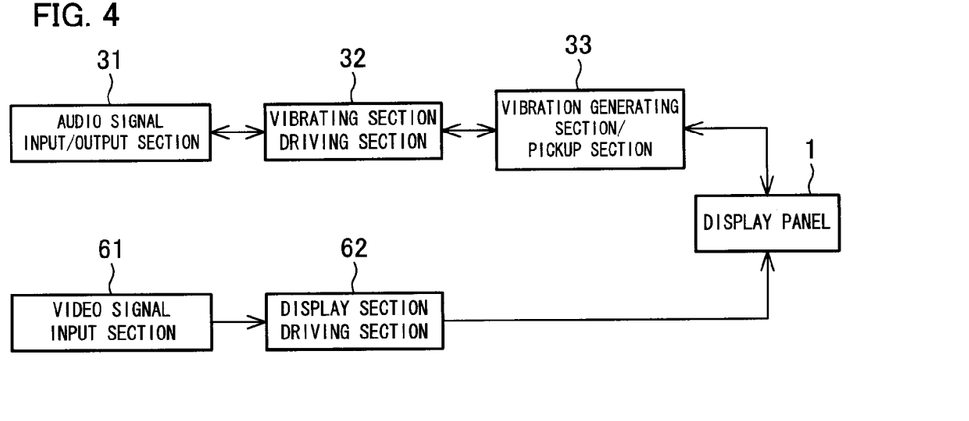
FIG. 4 is a block diagram showing yet another structure of the card-type device.

FIG. 4 is a block diagram illustrating a card-type device having both speaker function and microphone function in addition to the display function. In this card-type device, the vibration generating section is also used as the pickup section to selectively realize the speaker and microphone functions. The structures of the components for displaying images in the display panel 1 are the same as those described with reference to FIG. 2, and no further description is made therefor.

When functioning as a speaker, an audio signal input/output section 31 receives audio signals from various external devices. A vibrating section driving section 32 drives a vibration generating section/pickup section 33 based on the audio signals supplied to the audio signal input/output section 31. The vibration generating section/pickup section 33 is provided for the card-like display panel 1. The vibration generating section/pickup section 33 causes the display panel 1 to vibrate according to the electrical signals induced by the vibrating section driving section 32.

When functioning as a microphone, the display panel 1 vibrates in response to external sound, and the vibration generating section/pickup section 33 converts the vibration of the display pane 1 into electrical signals. The vibrating section driving section 32 then amplifies the electrical signals produced in the vibration generating section/pickup section 33. By the audio signal input/output section 31, the electrical signals amplified in the vibrating section driving section 32 are outputted to various external devices.

In this manner, as schematized in FIG. 1, the card-like display panel 1 itself constitutes the vibrating section and vibrates to generate and pickup sound.

As the vibration generating section/pickup section 33, a piezoelectric element may be used that is structured from a thin plate of quartz, crystal of Rochelle salt, or ceramic. Further, as in the foregoing, the vibrating section driving section 32 is not necessarily required. The vibration generating section and the pickup section may be separately provided.

Further, as in the foregoing, the display panel 1 itself can serve as the vibration generating section/pickup section 33 when a polarized material having piezoelectric effect or the like is used as transparent substrates that constitute a base of the display panel 1. In this case, the display panel 1 may be adapted so that the display panel 1 is caused to vibrate in response to the output signal of the audio signal input/output section 31 supplied either directly or via the vibrating section driving section 32, and that the electrical signals generated by undergoing vibration are outputted to the audio signal input/output section 31 either directly or via the vibrating section driving section 32.

Figure 5:
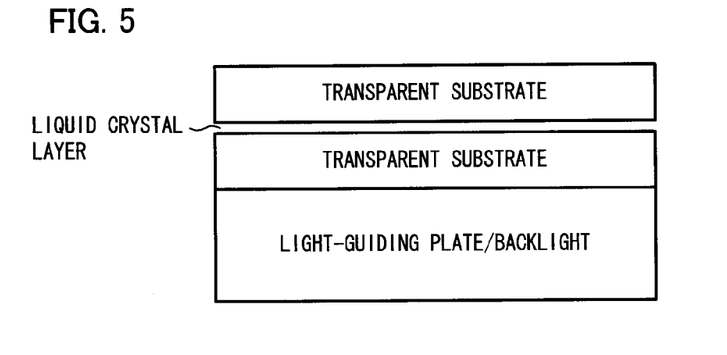
FIG. 5 is a cross sectional view of a transmissive liquid crystal display panel.

In the following, description is made as to display modes that can be adopted by the display panel 1. One example is a display mode using liquid crystal. The liquid crystal display mode may be of a transmission type or a reflection type. In the transmission mode, as shown by the cross sectional diagram of FIG. 5 representing a typical structure, a backlight is installed behind a cell that includes a liquid crystal layer between a pair of transparent substrates. This is disadvantageous in terms of thickness of the card-type device. However, the transmission mode excels in color reproduction and contrast ratio.

Figure 6:
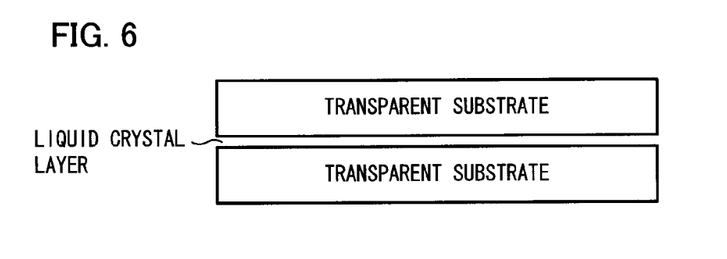
FIG. 6 is a cross sectional view of a reflective liquid crystal display panel.

In the reflection type, as shown by the cross sectional diagram of FIG. 6 representing a typical structure, only a pair of transparent substrates sandwiching the liquid crystal layer essentially add to the thickness of the card-type device. This reduces the thickness of the card-type device. Further, in the reflection type, the substrate on the opposite side of the display surface is not necessarily required to be a transparent substrate. Note that, use of ferroelectric liquid crystal as a liquid crystal material enables retention of display data, and reduction in power consumption in displaying still images.

Figure 7:
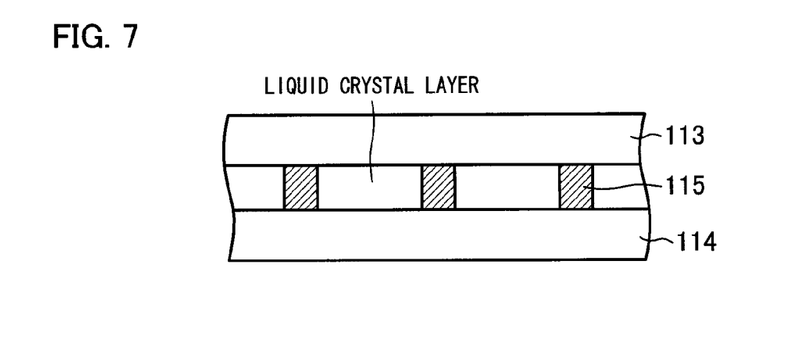
FIG. 7 is a diagram showing spacers suitably used in a liquid crystal display panel used as a vibrating section.

When using these liquid crystal display modes, there are cases where the gap between the transparent electrodes disposed on either side of the liquid crystal layer is changed by the vibration, with the result that display is adversely affected. This is counteracted by the provision of spacers between transparent substrates 113 and 114 disposed on either side of the liquid crystal layer. Preferably, the spacers are pillars or walls of a uniform height, as represented by spacers 115 in FIG. 7. Such spacers are disclosed in Patent Publication 7, for example.

Figure 8:
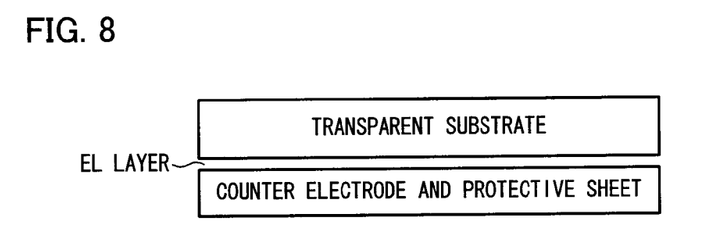
FIG. 8 is a cross sectional view of a display panel that performs display using an EL element.

The display may be of a mode using an EL (electro luminescence) element. In this display mode, as shown in the cross sectional diagram of FIG. 8 representing a typical structure, an EL layer is disposed between a transparent substrate and a layer of counter electrode and protective sheet. Since only one transparent substrate is required, the thickness of the card-type device can be reduced farther as compared with the liquid crystal display mode. Further, use of a solid phase EL element affords resistance to audio vibration. In this case, the adverse effects of vibration on display quality can be reduced when the display section vibrates itself to generate or pickup sound.

Figure 9:
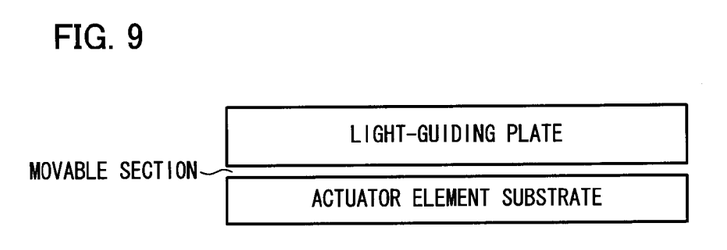
FIG. 9 is a cross sectional view of a display panel that performs display by changing the state of scattering or diffusion of incident light in a movable pixel section controlled with a piezoelectric element or a micromachine.

In another example of display mode, a movable pixel section is controlled with a piezoelectric element or a micromachine to alter the state of scattering or diffusion of incident light. In this display mode, as shown by the cross sectional diagram of FIG. 9 representing a typical structure, the movable section is disposed between a light-guiding plate and an actuator element substrate. Thus, in effect, the thickness is only attributed to the light-guiding plate controlling incident light, and the substrate for the thin actuator element. This can further reduce the thickness of the device compared with the liquid crystal display mode.

Figure 10:
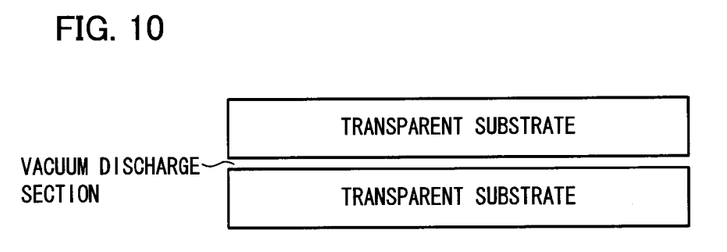
FIG. 10 is a cross sectional view of an FED display panel.

An FED (Field Emission Display) mode is another example. The FED mode employs a structure in which a vacuum discharge section is interposed between a pair of transparent substrates, as shown by the cross sectional diagram of FIG. 10. The FED is self-emitting and excels in contrast and color reproduction. The display quality of FED is therefore considered to be superior to that of the display mode using EL element. Further, since the FED is basically a cold cathode tube, it can emit light longer and lasts much longer as compared with the display mode using EL element.

In the display panel 1 employing the display mode shown in FIGS. 5, 6, 8, and 10, a polarized material having piezoelectric effect or the like may be used for the transparent substrates constituting the base, as described above, so that the display panel 1 can serve not only as the vibrating section but as the vibration generating section, the pickup section, or the vibration generating section/pickup section.

The polarized material having piezoelectric effect or the like, used for the transparent substrates, may be, for example, a light-transmissive ceramic material whose crystallization is controlled to have polarization. For example, LUMICERA™ available from Murata Manufacturing Co., Ltd. may be used as such a light-transmissive ceramic material of the transparent substrates with piezoelectric effect.

The Murata product LUMICERA™, however, does not exhibit piezoelectric effect because the directions of molecular polarization of the crystal grains in the polycrystalline structure are not aligned in order to suppress birefringence of incident light. For use as the transparent substrates of the present invention, LUMICERA™ can be modified to exhibit piezoelectric effect or the like, by employing a crystal growth technique that provides a regular crystal orientation in the polycrystalline structure, or by forming single crystals.

In the display panel 1 employing the display mode shown in FIG. 9, a polarized material having piezoelectric effect or the like can be used for the light-guiding plate. This enables the display panel 1 to serve as not only as the vibrating section but as the vibration generating section, the pickup section, or the vibration generating section/pickup section.

Figure 11:
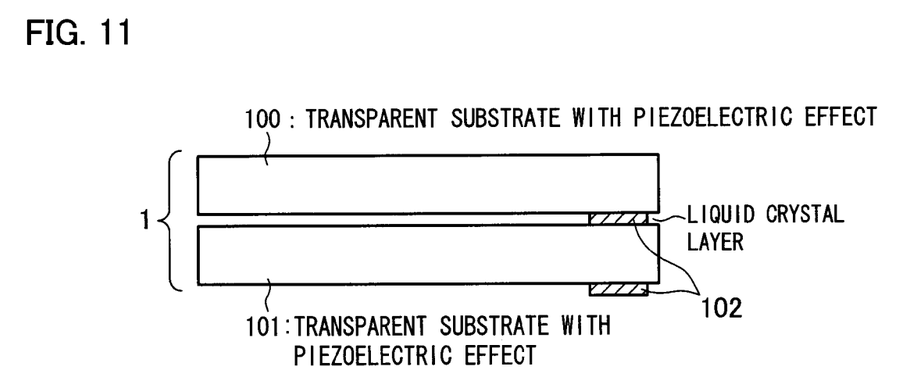
FIG. 11 is a diagram showing an exemplary structure in which a vibrating generating section is omitted by using transparent substrates having piezoelectric effect for the liquid crystal display panel.
Figure 12:
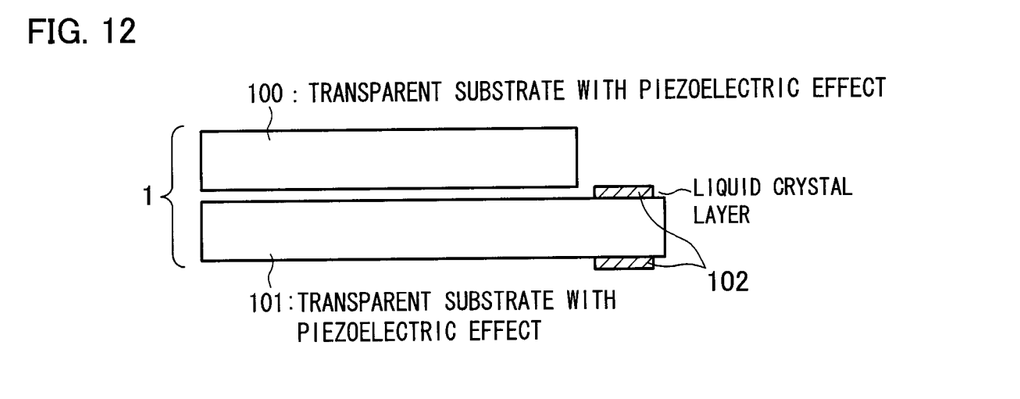
FIG. 12 is a diagram showing another exemplary structure in which a vibrating generating section is omitted by using transparent substrates having piezoelectric effect for the liquid crystal display panel.
Figure 13:
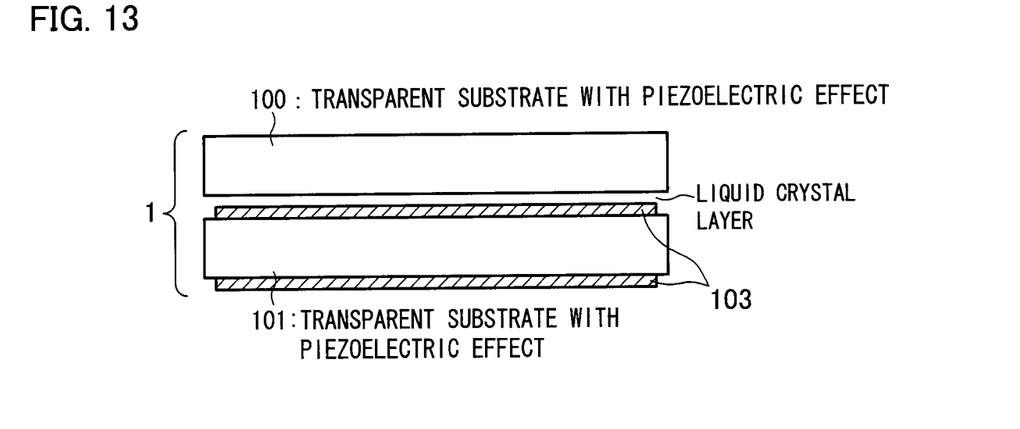
FIG. 13 is a diagram showing yet another exemplary structure in which a vibrating generating section is omitted by using transparent substrates having piezoelectric effect for the liquid crystal display panel.

FIGS. 11 through 13 illustrate exemplary structures of the display panel 1 in which a polarized material having piezoelectric effect or the like is used for the transparent substrates. Here, the reflective liquid crystal display mode shown in FIG. 6 is used.

The display panel 1 employing the liquid crystal display mode uses a pair of transparent substrates constituting a base. In the example shown in FIG. 11, only a transparent substrate 101, or both transparent substrates 100 and 101 have piezoelectric effect. Electrodes 102 are provided on either side of the transparent electrode 101 in a non-display region (frame region) on one side of the transparent substrate 101. The electrodes 102 are connected to the audio signal input section 11, the audio signal output section 24, or the audio signal input/output section 31, either directly or via any of the vibrating section driving section 12, 23, and 32.

In the example shown in FIG. 12, electrodes 102 are formed on protruding portions of the lower transparent substrate provided with a terminal section or the like. The interconnection is the same as that described with reference to FIG. 11, and no further explanation is made. In the systems shown in FIGS. 11 and 12, the strain stress by the piezoelectric effect is generated in portions between the electrodes 102, and is transmitted as a bending vibration through the entire transparent substrates and into the air.

In the example shown in FIG. 13, electrodes 103 are provided on one of the transparent substrates 100 and 101 having piezoelectric effect, namely the transparent substrate 101, so as to cover a region that contributes to display. The electrodes 103 may be made of transparent conductive films, for example, such as ITO, formed on both sides of the transparent substrate 101. Alternatively, one of the electrodes 103 may be made of a conductive layer laminated below a reflective electrode, and the other may be formed on the side of the transparent electrode 101 opposite the liquid crystal layer. As with the electrodes 101, the electrodes 103 are also connected to the audio signal input section 11, the audio signal output section 24, or the audio signal input/output section 31, either directly or via the vibrating section driving section 12, 23, or 32. This structure affords a large area for the vibration generating section, the pickup section, or the vibrating generating section/pick up section as compared with the structures shown in FIGS. 11 and 12, making it possible to increase the gain of sound generation or sound pickup.

In the structures shown in FIGS. 11 and 12, the electrodes 102 are formed on one side of the display panel 1. However, the electrodes 102 may alternatively be provided at more than one location (two locations in the Figure) of the display panel 1. This realizes stereo sound reproduction and directivity, in addition to increasing the gain of sound generation and sound pickup. Further, even when there are adverse effects of vibration on display, it can be attenuated by the interference effect in the display panel 1. The interference effect can also reduce a local disturbance of liquid crystal orientation in the display panel 1, when a movable material such as liquid crystal is used for the display panel 1. As a result, display quality can be improved or maintained.

In the structures shown in FIGS. 11 through 13, the transparent substrate 100 not provided with the electrodes 102 or 103 also have piezoelectric effect. However, this is not necessarily required. For cost consideration, the material of transparent substrate may be selected from conventionally available materials to optimize vibration characteristics of the base of the display panel 1, as will be described later.

Further, the electrodes 102 or 103 may be provided for both of the transparent substrates 100 and 101. When a reflection mode is used, the substrate 101 does not need to be transparent.

Figure 14:
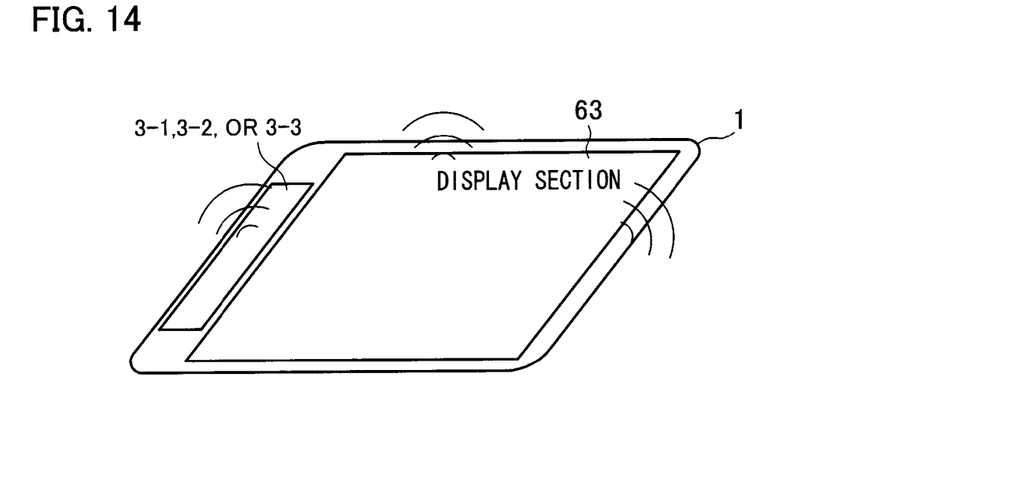
FIG. 14 is a diagram showing an example of providing a vibration generating section, a pickup section, or a vibration generating section/pickup section on a non-display frame portion of a display panel.

In the case where the vibration generating section, the pickup section, or the vibration generating section/pickup section is provided separately from the display panel 1, these members may be disposed as shown in FIG. 14. Specifically, a vibration generating section 3-1, a pickup section 3-2, or a vibration generating section/pickup section 3-3 may be formed on the periphery of a display section 63 contributing to display in the display panel 1, i.e., on the frame portion that does not contribute to display.

When the display panel 1 is of a type that does not use the rear side of the display as in a reflective liquid crystal display for example, the vibration generating section, the pickup section, or the vibration generating section/pickup section may be provided, though not shown, on the rear side of the display panel 1, irrespective of the display section or frame portion. This structure affords a large area for the vibration generating section, the pickup section, or the vibration generating section/pickup section without lowering display quality, making it possible to increase the gain of sound generation or sound pickup.

Figure 15:
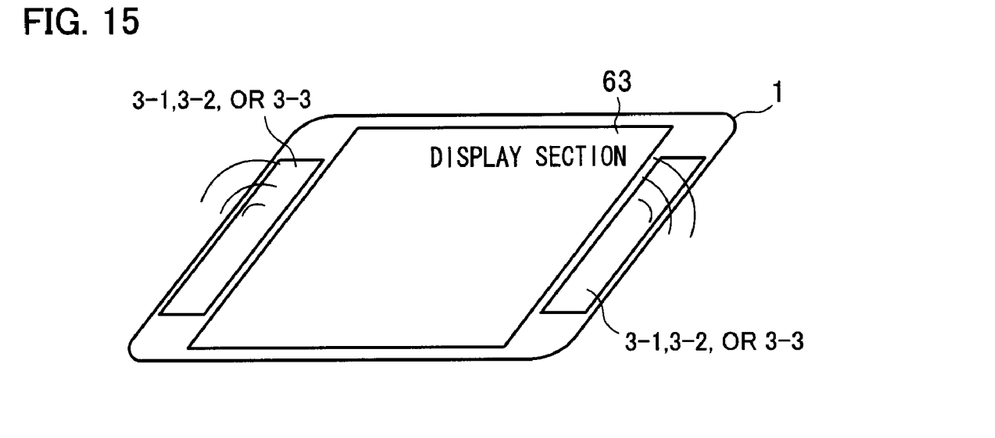
FIG. 15 is a diagram showing an example of providing a vibration generating section, a pickup section, or a vibration generating section/pickup section at more than one location on a non-display frame portion of a display panel.

Further, as shown in FIG. 15, the vibration generating section, the pickup section, and the vibrating generating section/pickup section may be formed on more than one location (two locations in the Figure) of the display panel 1. This realizes stereo sound reproduction and directivity, in addition to increasing the gain of sound generation and sound pickup. Further, even when there are adverse effects of vibration on display, it can be attenuated by the interference effect in the display panel 1. The interference effect can also reduce a local disturbance of liquid crystal orientation in the display panel 1, when a movable material such as liquid crystal is used for the display panel 1. As a result, display quality can be improved or maintained.

Figure 16:
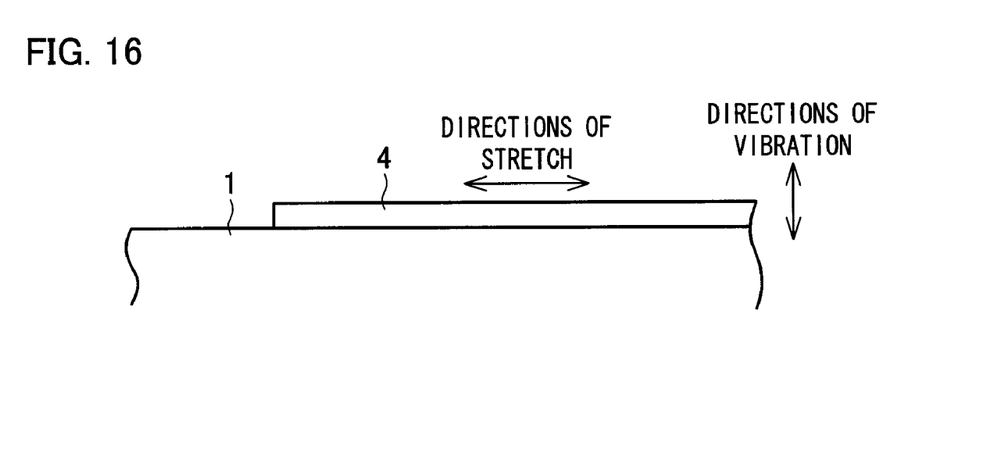
FIG. 16 is a diagram showing an example of structures of a sound generating section and a sound pick up section.

Further, as shown in the cross section of FIG. 16, a stretching plate 4 made up of ceramic or the like, constituting the vibration generating section, the pickup section, or the vibration generating section/pickup section may be directly formed on the display panel 1, so that sound can be generated or picked up by directly using a difference in piezoelectric displacement between the stretching plate 4 and the display panel 1. This structure is advantageous in terms of reducing the thickness of the card-type device.

Figure 17:
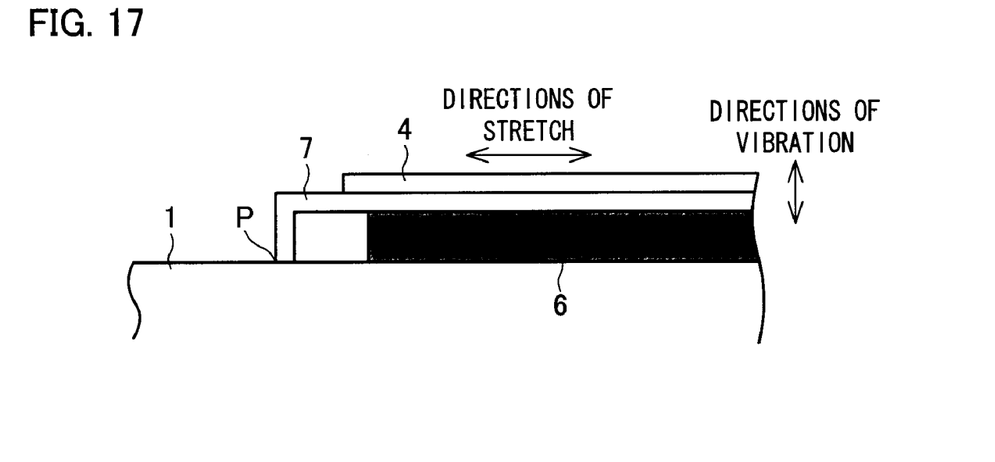
FIG. 17 is a diagram showing another example of structures of a sound generating section and a sound pick up section.

Alternatively, as shown in the cross section of FIG. 17, the stretching plate 4 may be provided on a vibration transmitting plate 7, such as a metal plate, that is supported with a material 6 filling the space between the vibration transmitting plate 7 and the display panel 1. Here, the material 6 is soft enough to be partly brought into direct contact with the display panel 1 but not to interfere with vibration. In this way, the vibration energy generated from a change in displacement between the stretching plate 4 and the vibration transmitting plate 7 is transmitted to a vibrating section 5 via a vibration energy transmission point (P in FIG. 17) to generate sound. This structure increases the gain of sound generation and sound pickup.

In the vicinity of portions of the vibration transmitting plate 7 in direct contact with the display panel 1, the absence of the material 6 allows the vibration energy to be efficiently transmitted. From the viewpoint of improving the gain of sound generation and sound pickup, it is preferable to increase the area of the vibration transmitting plate 7, light in weight, in portions not in direct contact with the display panel 1. When reducing the area of the vibration transmitting plate 7 in portions in direct contact with the display panel 1 to improve gain of sound generation and sound pickup, filling the material 6 between the vibration transmitting plate 7 and the display panel 1 provides sufficient strength against external pressure.

Figure 18:
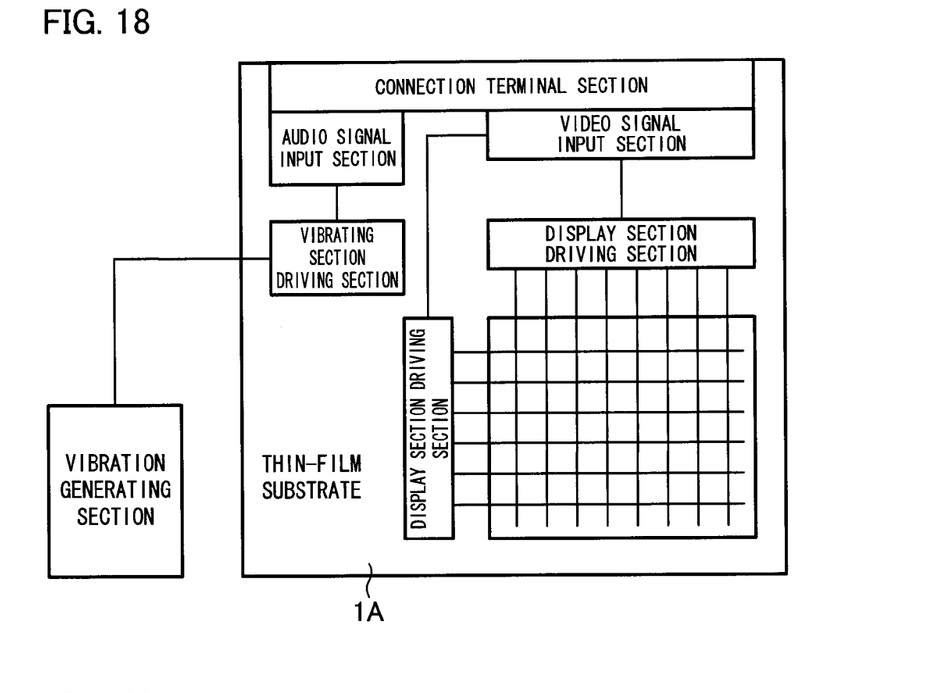
FIG. 18 is a diagram depicting a structure in which a circuit block of a display system is formed on a thin-film substrate constituting a display panel on which circuit elements of a display section are formed.

As depicted in FIG. 18 for example, all of or part of a display system circuit block (video signal input section 61 and display section driving section 62) or an audio system circuit block (specifically, audio signal input section, audio signal output section, audio signal input/output section, and vibrating section driving section) for audio signals may be directly formed on a thin-film substrate (transparent substrates sandwiching the liquid crystal layer, having TFT (thin film transistor) or the like formed thereon in the case of liquid crystal display) 1A on which circuit elements of the display panel 1 are formed. As the thin-film substrate 1A, a polycrystalline silicon thin film is used, for example. By using continuous grain silicon in particular, an increased number of circuit elements can be formed.

Further, when there is a circuit whose characteristics are undesirable for the acoustic characteristics of the display panel undergoing vibration or undesirable for the electricity-vibration conversion characteristics of the vibration generating section, the foregoing arrangement allows the vibrating section driving section including such a circuit to be integrated on the thin film formed on the display panel. In this way, required performance can be obtained without spoiling portability of the card-type device, thereby realizing a card-type device that is convenient to use yet excels in performance.

One specific example of such a circuit integrated on the thin film is a low-pass filter having optimum frequency characteristics for suppressing the high-frequency enhancing characteristics observed in the vibration generating section by the piezoelectric effect. Since the integrated circuit is formed by photo-lithography in the step of forming the pixel section of liquid crystal display or EL display, a designated circuit that has been optimized for the acoustic characteristics of the display panel 1 or the characteristics of the vibration generating section can be provided without increasing manufacturing cost.

Note that, in the card-type device of the foregoing structure, the signal interface for external devices may be wired or wireless. The transmitted signals may be base band signals or modulation signals.

A card-type device of the present invention can be used as a small and lightweight terminal device either by itself or by addition of only a limited number of peripheral devices and a cabinet. A card-type device of the present invention is also applicable to various types of video and audio electrical devices such as a television set, a portable phone, a photo stand, or a device that generates sound by character recognition. In these applications, by providing the card-type devices of the foregoing structures as means for inputting or outputting audio or means for outputting video, a user is able to enjoy audio or video conveniently.

Based on the structure of the display panel 1 used as the vibrating section itself, or as the vibrating section/vibration generating section, the pickup section, or the vibration generating section/pickup section, the following will describe modifications to the display panel 1 that are made to suit predetermined sound quality without losing integrity of the display panel 1 as a display.

Unlike structures that deal with only audio functions as in the conventional acoustic device using a piezoelectric speaker or the conventional acoustic device using a panel member as described in Patent Publication 3, the structure that realizes the speaker function or microphone function by causing the display panel 1 to vibrate itself needs to ensure required sound quality (predetermined sound quality) without adversely affecting the display function of the display panel 1. As used herein, the meaning of "sound quality" includes at least frequency characteristics and sound quality.

In studying the display panel 1 employing various display modes such as the (reflective) liquid crystal display mode as described above, the inventors of the present invention found that the vibration characteristics of the panel as a whole were attributable to the vibration characteristics of the base having a required rigidity among the components of the panel, i.e., the transparent substrate (light guiding plate in the display mode shown in FIG. 9).

Being transparent is just one of the required properties of the base material used for the display. The base material also needs to be resistant to a heat treatment required in the step of forming the pixel section, and needs to have a very small coefficient of expansion and a certain strength. These and other restrictions need to be taken into consideration in selecting the base material.

For this reason, glass that is produced by a highly sophisticated technique, or a fiber-filled plastic of unique properties as described in Patent Publication 5 has been used conventionally. In consideration of these conditions that can impose restrictions on desired acoustic characteristics, the present invention proposes a new design concept that actively incorporates profiles of the base in the acoustic characteristics, in addition to selecting a structure of the display including the base made of a material suited for desired sound quality, and selecting a material of the base.

Figure 19:
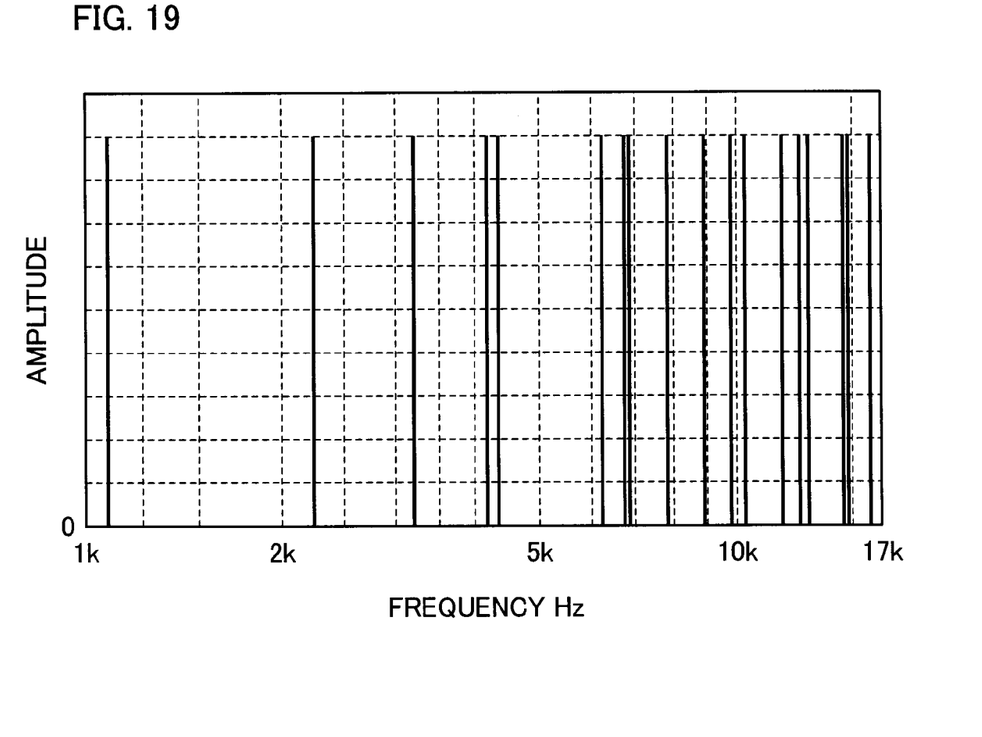
FIG. 19 is a diagram representing a result of examination on resonating frequencies that occur when a glass substrate is vibrated at one location with a vibrating generating section.

FIG. 19 represents a result of examination of resonating frequency, which was conducted by causing a glass substrate to vibrate at one location with a vibration generating section. The glass substrate had dimensions of a conventional common liquid crystal display panel (0.7 mm×90.3 mm×64.0 mm (thickness×length×width)). As can be seen from FIG. 19, the glass substrate had many resonant points in a frequency range above 5 kHz. Below 5 kHz, the glass substrate had a few resonant points and seldom resonated.

The result shows that, when generating or picking up sound by causing the glass substrate to vibrate, the glass substrate can sufficiently vibrate to produce a sufficient sound volume for sound frequencies above 5 kHz, whereas the vibration of the glass substrate is not sufficient and sufficient sound volume cannot be obtained (insufficient acoustic characteristic) for sound frequencies below 5 kHz.

Acoustic devices that reproduce (sound generation) and pick up human voice uses a frequency range of from about 800 Hz to 2 kHz. Identification of a person generating a voice requires reproduction of frequencies below 800 Hz. For reproduction/pick up of music, frequencies above 2 kHz need to be accommodated. It follows from this that ideal acoustic characteristics can be obtained when the number of resonant points of the display panel 1 is increased in a target sound range of the sound frequencies to be generated/picked up by the card-type device.

In the assessment made in the present invention, the vibration characteristics of a flat panel member can be changed by varying the size, thickness, or flexure of the panel member. The number of resonant points in a desired range can be increased by increasing the size of the panel member, reducing the thickness of the panel member, or by using a low-density or soft material to increase flexure of the panel member. In this way, desirable vibration characteristics can be obtained in a frequency range required for the acoustic device that generates/picks up human voice. The number of resonant points in a desired range can also be increased effectively by adding a weight to a portion of the panel member, or by molding the non-display frame portion to have a non-uniform thickness.

In the present embodiment, the number of resonant points in a target (desired) frequency range is increased using at least one of the adjusting techniques selected from varying the size of the base of the display panel 1, varying the thickness of the base of the display panel 1, varying the flexure of the base of the display panel 1, adding a weight, and varying the thickness. The adjusting technique that varies flexure can be used more effectively for plastic substrates, which are more flexible than the glass substrate. Preferably, the adjusting technique that varies the base size is combined with other adjusting techniques, because the size of the base in the display panel 1 is basically determined by the size of the display section 63 and because this generally restricts the acceptable area of the frame region in some degree.

In a display device in which a plurality of transparent substrates (may include non-transparent substrate) are laminated close together as in the liquid crystal display panel shown in FIG. 6, each substrate vibrates independently. Thus, in the display panel 1 with a plurality laminated substrates, each substrate can be regarded as the base.

Figure 20:
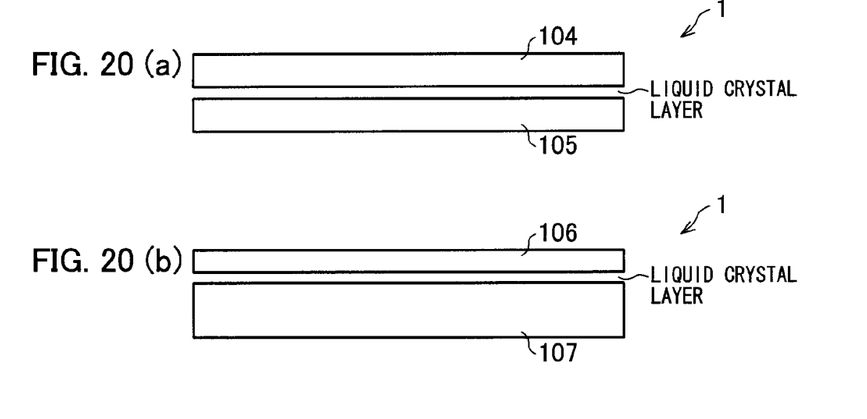

FIG. 20 depicts an example of adjusting the thickness of the base in the display panel 1. This example is based on the reflective liquid crystal display panel shown in FIG. 6. In FIG. 20(*a*), the thicknesses of both of the transparent substrates 104 and 105 making up the base of the display panel 1 are reduced, in order to reduce the total thickness of the transparent substrates 104 and 105 and increase the number of resonant points in a predetermined target frequency range. In FIG. 20(*b*), the thickness of only one of transparent substrates 106 and 107 making up the base of the display panel 1 is reduced. Specifically, the thickness of the transparent substrate 106 is reduced much more than the transparent substrate 107, in order to reduce the total thickness of the transparent substrates 106 and 107 and increase the number of resonant points in a predetermined target frequency range.

Figure 21:
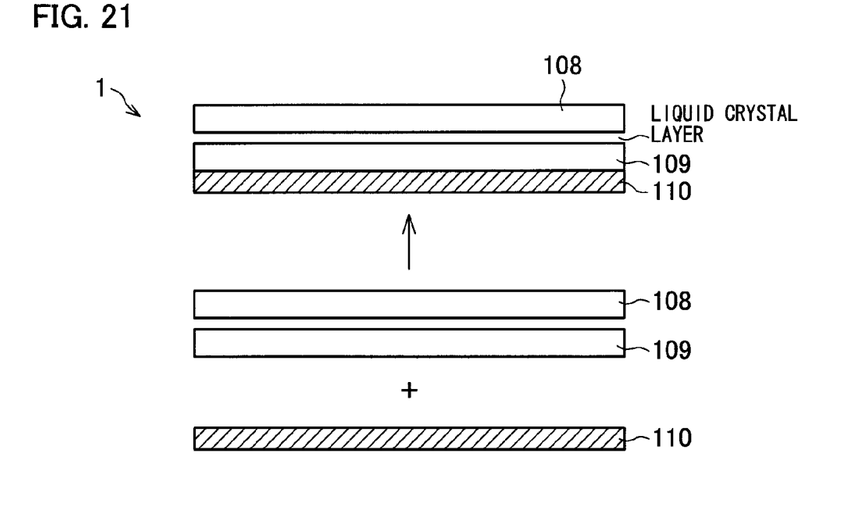
FIG. 21 is a cross sectional view showing an example of affixing a sheet-like member to a base to increase the number of resonant points of the base of a liquid crystal display panel in a predetermined target frequency range.

FIG. 21 represents an example in which the base of the display panel 1 is adjusted with the use of a very thin base laminated with a sheet member 110. This example is also based on the reflective liquid crystal display panel shown in FIG. 6. Transparent substrates 108 and 109 making up the base of the display panel 1 are very thin and flexible substrates which themselves have a very weak rigidity. By laminating (for example, bonding) the sheet member 110 on the substrate, the thickness is adjusted to have an increased number of resonant points in a predetermined target frequency range, as well as appropriate durability as a display.

In this structure, the sheet member 110 laminated on the substrate also vibrates with the base of the display panel 1. Thus, by adjusting the material or thickness of the sheet member 110, the same effect obtained by the technique of adjusting the material of the base can also be obtained. The technique of laminating the sheet member 110 is particularly advantageous when a large number of multi-purpose bases of the transparent substrates 108 and 109 are used, because the thickness can be adjusted to have an increased number of resonant points in a predetermined target frequency range simply by changing the thickness or material of the sheet member 110 according to different acoustic characteristics required for different purposes. This increases productivity and reduces cost of mass-produced multi-purpose bases, and excels in versatility since the change can be made after production.

FIG. 22 represents an example in which adjustment is made by affixing a weight 112 to a frame region of the base of the display panel 1. This example is also based on the reflective liquid crystal display panel shown in FIG. 6. Note that, the manner in which the weight is affixed to the transparent substrate 111 constituting the base is not restricted so long as the number of resonant points in a predetermined target frequency range can be increased. The number of weights, or the location of the affixed weight can be appropriately selected. Further, instead of affixing the weight, a substrate may be used that has been molded to have an increased thickness in a portion where the weight could be affixed.

The glass substrates used as the transparent substrates of the display panel 1 may be replaced with plastic substrates, for which the plastic substrates disclosed in Patent Publications 5, 6, and 8 may be used for example. Owning to the property of resin, the plastic material is more flexible and more easily vibrate compared with the glass substrate. Thus, by using plastic substrates and adjusting their thickness, the number of resonant points in a predetermined target frequency range can be adjusted to increase more easily and more precisely.

It has been confirmed that, with the use of composite bases as disclosed in Patent Publications 5, 6, and 8, a variety acoustic characteristics can be realized by adjusting the properties or profiles of the materials of the composite bases. Composite substrates are made of a material (composite material) including a resin matrix supplemented with a filler. The composite substrate is used to reduce a coefficient of linear expansion and improve dimensional stability of the plastic substrate.

Patent Publication 6 discloses a reflection-type conductive substrate provided with a composite substrate that has been formed by curing a glass fiber cloth impregnated with resin. Patent Publication 8 discloses aplastic substrate including a composite substrate in which lines or bands of fibers are included in a resin without making contact with one another.

Patent Publication 5 discloses a composite substrate in which fiber bundles are disposed substantially orthogonal to one another. As taught in this publication, the substantially orthogonal orientation of the fibers directing in two different directions (direction of the long axis of the fibers may be referred to as "orientation direction") in the fiber-filled composite substrate is preferable because it renders the material isotropic for properties such as a coefficient of linear expansion (other examples include mechanical properties and heat properties). The publication also teaches that the fibers directing in two different directions in the substantially orthogonal orientation are preferably a woven material because it improves mechanical strength.

When such composite materials have different mass densities in the materials contained therein, it is possible to adjust the proportions of the respective components. This enables the average mass of the base to be readily varied as a whole, and the number of resonant points in a predetermined target frequency to be increased.

Further, because the composite material contains a fibrous component, the vibration characteristics of the base can be averaged as a whole, which improves reproducibility of the resonant points occurring in a predetermined target frequency range. As a result, sound quality is stabilized.

This effect can be enhanced by providing the fibers in bundles. Further, by adjusting the thickness or number of bundled fibers, the natural frequency of the fibers or fiber bundles can be varied to adjust the number of resonant points.

Further, by weaving the fabric as in the composite base material disclosed in Patent Publication 5, the effects of averaging vibration characteristics, improving reproducibility of occurrence of the resonant points, and adjusting the natural frequency can be enhanced in the base as a whole.

When the transparent substrates constituting the base of the display panel are polarized transparent members 100 and 101 having piezoelectric effect as shown in FIGS. 11 to 13, the thickness and/or density of the transparent members 100 and 101 may be suitably adjusted to have piezoelectric characteristics with an increased number of resonant points in a predetermined target frequency range.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

A card-like device with superior portability is provided in which functions as an audio input/output device are incorporated in the space reserved for display. The card-like device is therefore highly portable, and can easily be used by being combined with other devices. It is also very easy to incorporate the card-like device in other devices. In the recent ultrathin digital cameras, the audio input/output function can be added to these vary thin devices, which conventionally could not incorporate a display or audio device. In devices already having the input/output function, the sound quality can be greatly improved. In foldable portable phones that add an extra thickness in a folded state, use of the card-like device can reduce the thickness of the device. In addition to these applications as a system component that modifies the shape of conventional devices, the card-like device can contribute to realize truly ubiquitous thin clients even for non-"niche" users using information obtained from surrounding ubiquitous information services.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A card-type device for generating and/or picking up sound by causing a display panel to vibrate itself, wherein:
   a base of the display panel is made from a composite material with two or more kinds of components;
   at least one of the components of the composite material is a fibrous material; and
   a thickness of the fibrous material is set to suit a predetermined sound quality.

2. The card-type device as set forth in claim 1, wherein the fibrous material is a bundle of fibers.

3. The card-type device as set forth in claim 1, wherein the fibrous material is a woven cloth.

4. The card-type device as set forth in claim 2, wherein the bundle of fibers is a woven cloth.

* * * * *